United States Patent [19]
Trefzger

[11] Patent Number: 5,544,220
[45] Date of Patent: Aug. 6, 1996

[54] SYSTEM FOR INTEGRATING A STAND ALONE INBOUND AUTOMATIC CALL DISTRIBUTOR AND AN OUTBOUND AUTOMATIC CALL DIALER

[75] Inventor: Alan R. Trefzger, Sterling, Va.

[73] Assignee: EIS International, Inc., Stamford, Conn.

[ * ] Notice: The term of this patent shall not extend beyond the expiration date of Pat. No. 5,425,093.

[21] Appl. No.: 456,831

[22] Filed: Jun. 1, 1995

Related U.S. Application Data

[63] Continuation of Ser. No. 21,305, Feb. 23, 1993, Pat. No. 5,425,093.

[51] Int. Cl.$^6$ ............................................. H04M 3/22
[52] U.S. Cl. ........................... 379/266; 379/309; 379/92; 379/216
[58] Field of Search ............................ 379/265, 266, 379/309, 112, 92, 96, 216, 67, 137

[56] References Cited

U.S. PATENT DOCUMENTS

| | | | |
|---|---|---|---|
| 3,859,473 | 1/1975 | Brown et al. | 379/266 |
| 4,620,066 | 10/1986 | Bushnell et al. | 379/266 |
| 4,829,563 | 5/1989 | Crockett et al. | 379/216 |
| 4,896,345 | 1/1990 | Thorne | 379/266 |
| 5,181,236 | 1/1993 | LaVallee et al. | 379/216 |
| 5,214,688 | 5/1993 | Szlam et al. | 379/137 |
| 5,247,569 | 9/1993 | Cave | 379/309 |
| 5,309,513 | 5/1994 | Rose | 379/309 |
| 5,335,268 | 8/1994 | Kelly, Jr. et al. | 379/265 |
| 5,341,412 | 8/1994 | Ramot et al. | 379/265 |

*Primary Examiner*—Jeffery Hofsass
*Assistant Examiner*—Scott Wolinsky
*Attorney, Agent, or Firm*—Lane, Aitken & McCann

[57] ABSTRACT

An automatic call distributor system and an automatic call dialer system that are integrated so that each system has its own set of dedicated agents and the combined integrated system has a set of universal agents that can be switched between systems.

1 Claim, 3 Drawing Sheets

SYSTEM FOR INTEGRATING A STAND ALONE INBOUND AUTOMATIC CALL DISTRIBUTOR AND AN OUTBOUND AUTOMATIC CALL DIALER

This application is a continuation of application Ser. No. 08/021,305 of Alan R. Trefzger, filed on Feb. 23, 1993, for "System for Integrating a Stand Alone Inbound Automatic Call Distributor and a Outbound Automatic Call Dialer", now U.S. Pat. No. 5,425,093.

BACKGROUND OF THE INVENTION

1. Field of the Invention

This invention relates to an improved system for integrating an automatic outbound dialer with an automatic call distributor and, more particularly, to an improved integrating system to transfer agents between inbound and outbound operation without adversely impacting or losing features provided by the outbound dialer or inbound distributor when operating as a stand alone system.

2. Description of the Prior Art

Many companies employ both automatic inbound telephone call distributors and automatic outbound dialers. There are a number of presently commercially available inbound systems for directing inbound telephone calls to an available agent. These commercial inbound call distributors provide a range of features extending from relatively simple features to relatively complex. Similarly, commercially available automatic outbound dialers provide features and complexity ranging from relatively simple systems to relatively complex. This invention is directed to integrating a stand alone system designed for inbound operation with a stand alone system designed for outbound operation without adversely affecting the operation or features of either system.

As will be appreciated by those skilled in the art, there have been proposals in the prior art to link inbound automatic call distributors and automatic outbound call dialers in order to improve staffing efficiency. An inbound call distributor typically has peaks and valleys in its operation since the demand is generated by outside callers. By linking inbound and outbound call systems, outbound agents can be switched to inbound duty during peak inbound demand periods and switched back to outbound duty during slack periods in inbound demand, thus improving overall staffing efficiency.

Prior art integration proposals generally provide two pools of agents; outbound only agents and universal agents which can be switched between inbound and outbound operation. Inbound overflow traffic from the automatic call distributor is transferred to the automatic call dialer by means of trunks external to the automatic call distributor. The automatic outbound dialer directs the call to a universal agent. While such prior art systems are relatively simple in their implementation, these prior art systems have a number of operational disadvantages. Since inbound overflow calls are switched to the universal agents via trunks, features the automatic call distributor provides when processing an inbound call may be lost. Some things that may be lost include automatic caller number identification, data for report generation, and loss of an inbound call if a universal agent is not available. Further, such prior art integration systems degrade outbound call pacing.

SUMMARY OF THE INVENTION

An object of this invention is the provision of an integration system for outbound and inbound call systems that transfers agents between inbound and outbound operation without losing features of either the inbound or the outbound system.

Another object of this invention is the provision of an integration system that does not require modification of the automatic call distributor.

A further object of the invention is the provision of a system algorithm that determines on a call-by-call basis an allocation of universal agents between inbound and outbound operation.

Briefly, this invention contemplates an automatic call distributor integrated with an automatic outbound dialer so that so-called universal agents can be switched between systems. Each universal agent has a two-way audio set telephone communication. A universal agent's audio set is connected to the automatic call distributor.

The automatic outbound dialer controls the status of the universal agents. The automatic outbound dialer is connected to the automatic call distributor by a data link over which it receives inbound call status, queue status, and agent status and controls the universal agent status.

Connection from a universal agent audio set to inbound trunks is made through the inbound call director switch. Connection is made from a universal agent to the outbound trunks also by the inbound call director switch and in addition by a tie trunk to the outbound switch of the automatic call dialer. Preferably, universal agents are normally assigned to outbound calls and are only assigned inbound calls that cannot otherwise be handled by agents taking inbound calls. This maintains the productivity of the outbound system while handling peak inbound loads.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
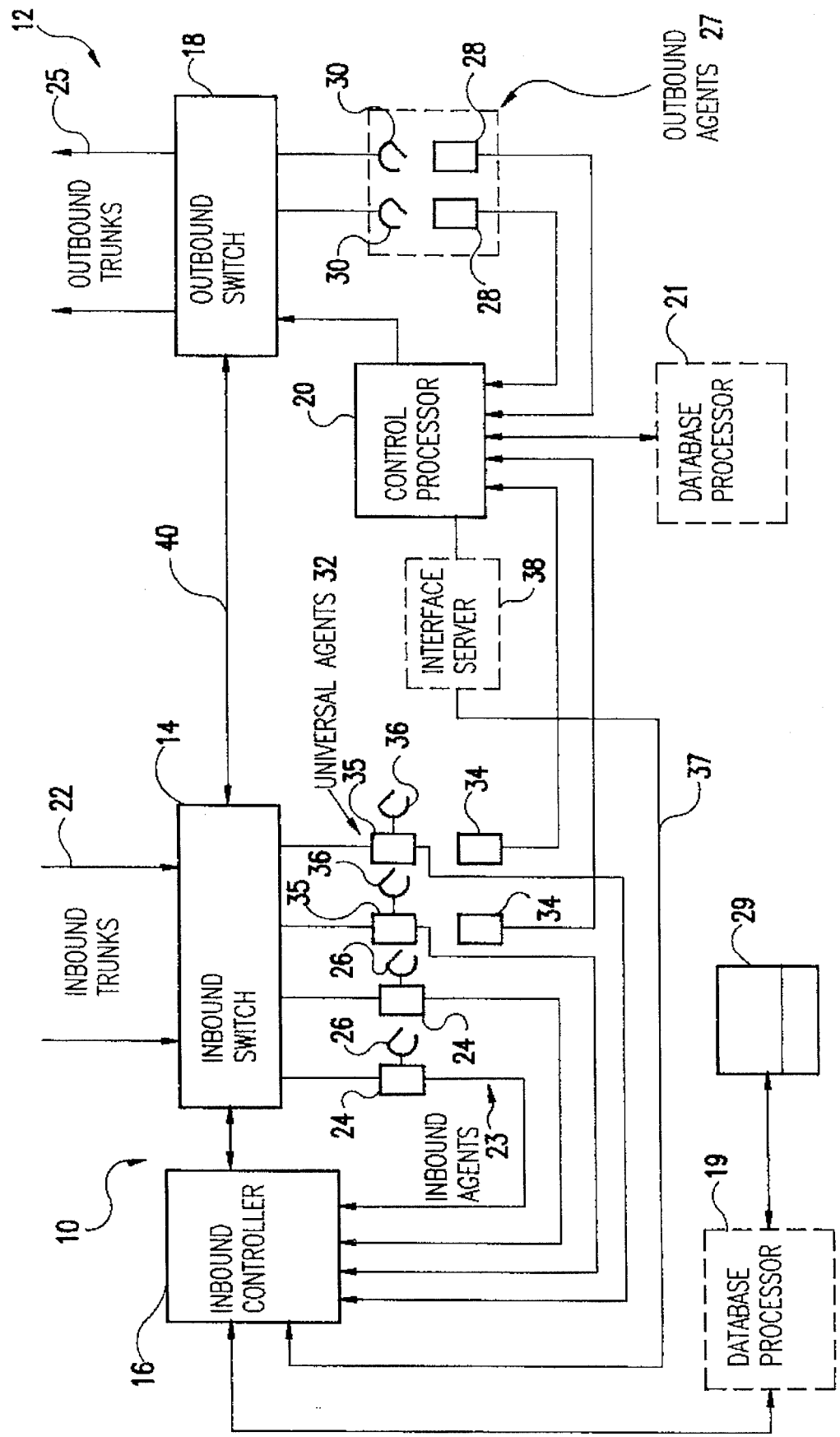
FIG. 1 is a block diagram of an automatic call distributor and an automatic outbound dialer integrated in accordance with the teachings of this invention.

Referring now to FIG. 1, a system in accordance with the teachings of this invention integrates an automatic inbound call distributor indicated by the general reference numeral 10, and an automatic outbound call dialer indicated by the general reference numeral 12. It will be appreciated that the automatic call distributor 10 and the automatic outbound dialer 12 contemplated by this invention may each be a commercially available prior art stand alone product. Automatic call distributors include the Advent model XXX available from Advent Corporation and automatic outbound dialers include the System 6000 available from ITC, the assignee of this application.

It will be appreciated that commercially available automatic call distributors and automatic outbound dialers are available with a number of functional capabilities. Insofar as relevant to this invention, the automatic call distributor 10 includes, functionally, an inbound switch 14 and an inbound switch controller 16. Similarly, the automatic outbound dialer includes an outbound switch 18 and an outbound call control processor 20. Inbound trunks 22 are connected to inbound switch 14 and outbound trunks 25 are connected to the outbound switch 18. Many commercial automatic call distributors include a data processor as shown in dotted lines at 19 in FIG. 1. Similarly, a data processor 21, which is part of an automatic outbound dialer is also illustrated. It will be appreciated by those skilled in the art that the functions of automatic call distributors and of automatic outbound dialers are often carried out by software controlled digital processing equipment and the descriptions herein are in terms of function and not limited to a particular hardware and/or software implementation of the described function.

The automatic call distributor 10 has a number of agents 23 dedicated to inbound operation. These agents function as they would in a standalone inbound operation. Each dedicated inbound agent 23 has a data set 24 connected to the inbound controller 16 and an audio set 26, for two-way telephonic communication, connected to the inbound switch 14 via the data set 24. Each inbound agent may have a stand alone terminal 29 connected to a data processor for displaying inbound caller information.

The automatic outbound call dialer 12 has a number of outbound agents 27 dedicated to outbound operation, and who function in the same manner as they would in a standalone outbound call dialer system. Each outbound agent has a terminal 28 (typically a keyboard and display) connected to the control processor 20, and an audio set 30 for two-way telephonic communication, connected to the outbound switch 18.

In accordance with the teachings of this invention, in addition to the dedicated inbound and dedicated outbound agents, there are one or more universal agents 32 that can be transferred between inbound and outbound operations. Each universal agent has a terminal 34 (e.g., a display and keyboard), a data set 35 and an audio set 36 for two-way telephone communication. The universal agent terminals 34 have a port connected to the control processor 20. The data set 35 for each universal agent is connected to the inbound controller 16, and each universal agent audio set 36 is connected to inbound switch 14 via the data set 35.

Tie trunks 40 provide a telephone link between outbound switch 18 and inbound switch 14. Tie trunks 40 allow the outbound trunks 25 to be connected to the universal agent audio sets 36 via the outbound switch 18 and the inbound switch 14. The inbound switch 14 connects the universal agent audio sets 36 to the incoming trunks 22.

Although the function could be performed manually by a supervisor, in a preferred embodiment of the invention, the control processor 20 is programmed to assign universal agents to outbound or inbound duty. The control processor 20 periodically issues a command over data link 37 to the inbound controller 16 seeking a status update of inbound operations, maintained by the inbound controller 16, such as, for example, agent status, call queues, and time-to-answer status. Based on data transmitted back to the control processor 20 from the inbound controller 16 via data link 37 and interface server 38, the control processor 20 allocates the universal agents 32 to inbound or outbound operation. In assigning a universal agent 32 to inbound operations, the control processor 20 notifies the inbound controller 16 that a particular universal agent is available for inbound operation. The inbound controller can then connect inbound calls on trunks 22 to the available universal agent via inbound switch 14.

In assigning a universal agent 32 to outbound operations, the control processor notifies the inbound controller 16 over data link 37 that the particular universal agent is not available for inbound operations. The control processor 20 also establishes a telephone link over tie trunk 40 through outbound switch 18 and inbound switch 14 between the outbound trunks 25 and the audio set 36 of a selected universal agent 32. With this audio telephone link established, completed outbound calls are switched to an assigned universal agent by outbound switch 18 in the same manner calls are switched to the dedicated outbound agents 27.

It will be appreciated that the control processor 20 generates an appropriate audio signal to let a universal operator know when he or she is transferred between inbound and outbound operations. In response to this signal, the agent can couple his or her two-port terminal 34 to either inbound controller 16 or control processor 20, as appropriate. A suitable manually-operated switch may be used for this purpose.

A universal agent 32 first logs on to the automatic call distributor 10 through his or her terminal 34 sending an appropriate log-on command to the inbound controller 16, but remains idle. The universal agent then logs onto the automatic outbound call dialer 12 by sending appropriate information to the control processor 20, including teleset or phone number information to identify the universal agent. When a universal agent logs on to the outbound system, the central processor 20 places a call to the logged-on universal agent. The call is placed over the tie trunks 40. In some implementations of the invention, the tie-trunk remains connected through all inbound and outbound operations until the operator logs off. In other implementations, the tie-trunk connection is broken when an agent is assigned to inbound operation and must be re-established each time the agent is transferred from inbound to outbound operation. The tie trunk connections are preferably either digital T1 trunks or analog, loop-start trunks.

In a preferred embodiment of the invention, universal agents are assigned to outbound operation when the inbound load is "normal" or below normal. Based on inbound traffic relative to certain thresholds, the control processor 20 is programmed to transfer one or more universal agents to inbound service. The control processor 20 identifies an available (i.e., not busy) universal agent assigned to outbound service, places the tie trunk 40 to this agent in an on-hook status, and signals a change to a ready status to the inbound controller 16, for this universal agent. At this point the universal agent, which is always connected to the inbound switch 14, is in a ready status and will start receiving inbound calls from an appropriate queue. To transfer a universal agent back to outbound operation, when the inbound traffic warrants such a transfer, the control processor 20 signals the inbound controller 16 to place a selected universal agent in a "not ready" status for inbound calls after the conclusion of any in-progress call during the short period when the agent is in a ready state for the next call. At the conclusion of any in-progress call, the control processor 20 reestablishes the tie trunk connection to the universal agent.

Figure 2:
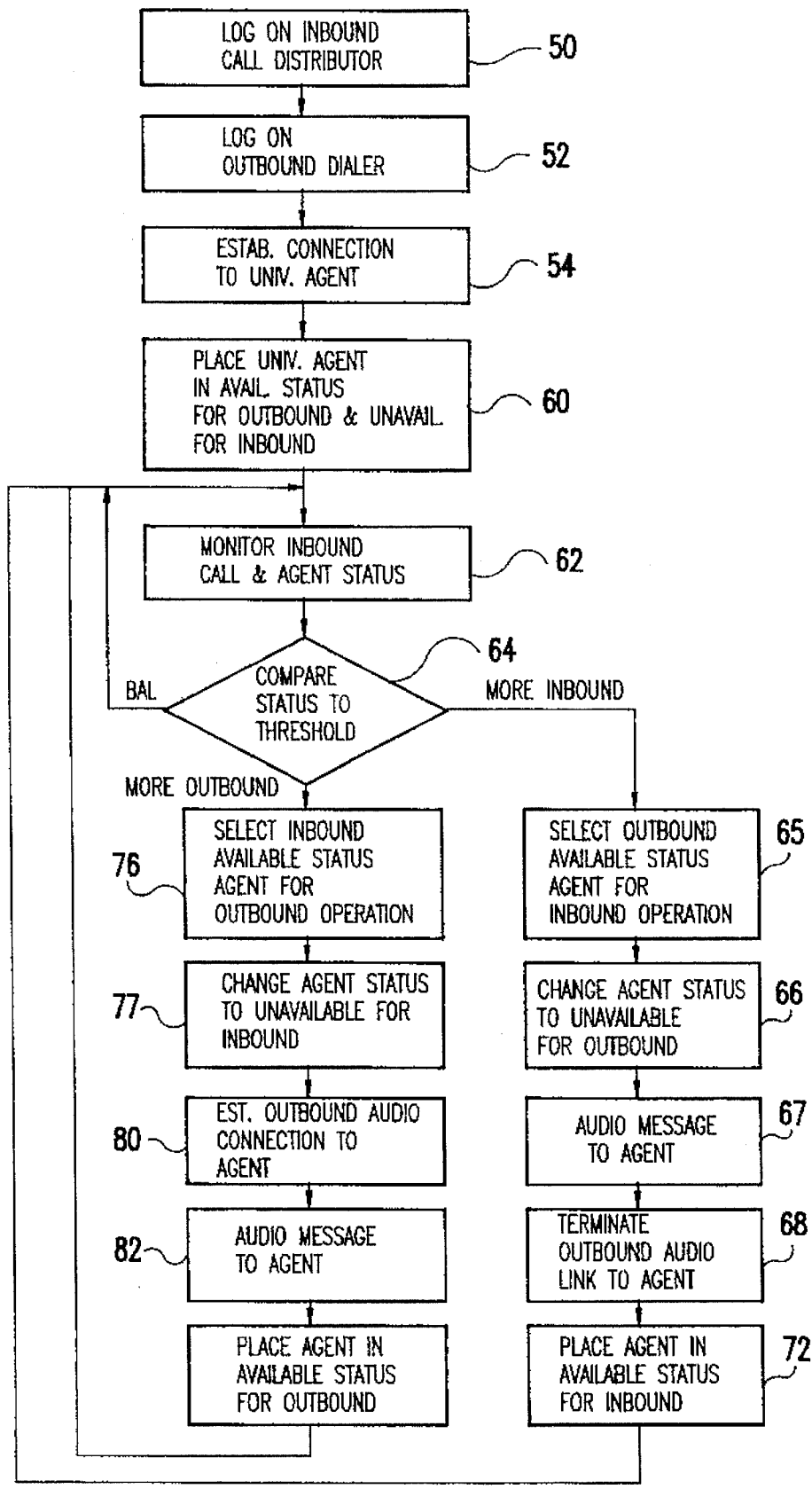
FIG. 2 is a system flow diagram showing the selecting universal operators and the connection of inbound and outbound calls to them in accordance with the teachings of this invention.

Referring now to FIG. 2, it shows a flow diagram of the operation of the integrated system in transferring universal agents between inbound and outbound operations. As previously explained, a universal agent initially logs-on the automatic call distributor 10, but in an idle status, as indicated in block 50. Next, the universal agent logs-on to the automatic outbound dialer 12 at block 52 by means of terminal 34, providing as part of the log-on procedure position information, such as teleset number of phone number, to the control processor 20. The control processor 20 establishes a dialed connection to the universal agent via outbound switch 18, tie trunk 40, and inbound switch 14, at step block 54. The universal agent answers his set by taking his or her set off-hook manually in response to the initial call. This initial call is the only call the universal agent answers manually; subsequent calls are transferred to the universal agent automatically, preceded by a tone that identifies the call as an inbound or outbound call.

The universal agent is placed in an available status (block 60) to accept outbound calls generated by the automatic outbound dialer 12, functioning in the same manner as it functions as stand alone system. When an outbound call is answered, the call is connected to the universal agent by the control processor 20 via outbound switch 18, tie trunk 40 and inbound switch 14.

In block 62, the control processor 20 monitors data relative to the volume of inbound calls to one or more thresholds, in order to determine whether or not to transfer universal agents from outbound operation to inbound operation or from inbound operation to outbound operation. Such threshold data comprises, for example, the ratio of inbound calls to inbound agents; the number of inbound calls in queue awaiting transfer to an agent; and duration of inbound calls spent in queue awaiting transfer to an agent. As will be appreciated by those skilled in the art, commercially available automatic call distribution commonly maintain one or more call control tables. The call control table is a step-by-step procedure for routing incoming calls on inbound trunks 22 and comprises a set of control table program commands including references to other control tables. Typical commands include converting voice and dialed digital information into control table variables, queuing and dequeuing commands, inbound traffic condition statements, and other call routing commands. Data relative to inbound traffic status can be accumulated by the inbound controller 16 by appropriate call control table commands and periodically accessed by the control processor 20 via data link 37. The control processor 20 compares the data relative to incoming call traffic volume to certain thresholds in order to determine whether or not to transfer universal agents from inbound to outbound operation or vice versa.

Figure 3:
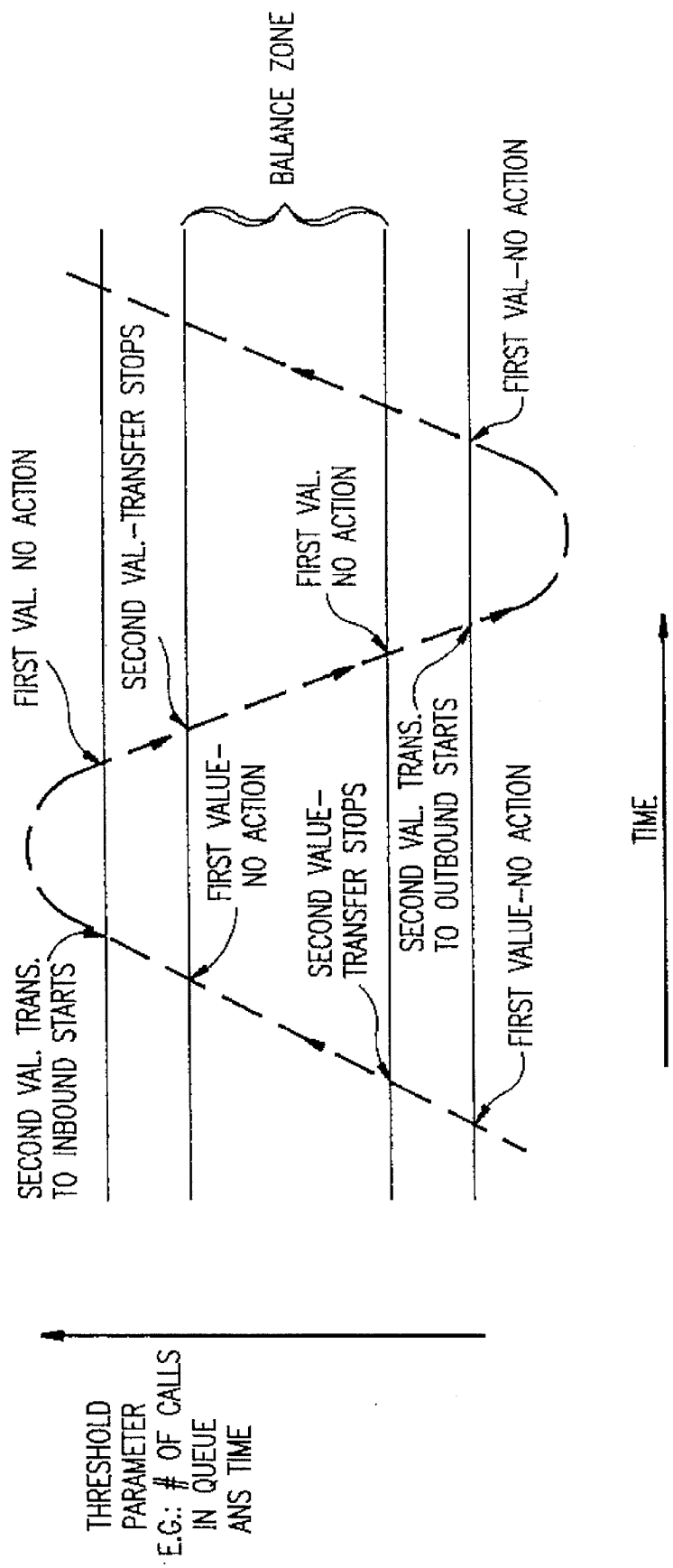
FIG. 3 is a pictorial diagram illustrating traffic status thresholds to allocate universal agents between outbound operation and inbound operation.

Referring now to FIG. 3 in addition to FIG. 2, each threshold may consist of a pair of values denominated in FIG. 3 as a first value and a second value. Here it should be noted, as indicated in FIG. 3, an absolute threshold value is characterized as a first or second value, depending upon the direction the inbound traffic volume is moving relative to thresholds. Assuming, for example, the inbound traffic volume data is the number of inbound calls in a queue awaiting transfer to an inbound agent. As the number of calls in the queue grows and passes the first threshold on the left-hand side of the drawing, control processor 20 continues to assign universal agents as they become available to outbound operation. When the number in the queue passes the second threshold value, the transfer of agents stops and the system enters a balanced region. If the number of calls in the queue continues to increase (as indicated in the drawing) the value passes first upper threshold value, but no action is taken by the control processor 20 to switch universal agents. When the second upper threshold is passed, the control processor starts switching universal agents to the inbound operation, and continues switching universal agents to inbound operation, until, what is now denominated in the drawing as a second threshold value, is passed and the system re-enters the balanced region and the transfer of agents stops.

Referring back now to FIG. 2, if in decision block 64, control processor 20 determines that universal agents should be transferred to inbound operation, the control processor 20 will select an available (i.e., not busy) universal agent then assigned to outbound operation, block 65. Control processor 20 changes the selected universal agent's status to unavailable for outbound, block 66. Control processor 20 then issues an audio message that his or her operational status is being changed, as indicated at block 67. The control processor 20 next terminates the telephonic connection to this universal operator over tie trunk 40, for example, by placing it in an on-hook status, and released the agent, block 68. The control processor 20 next transfers a command over data link 37 to inbound controller 16 changing the status of this universal agent to ready for inbound operation, block 72. The inbound controller 16 monitors the status of the universal agent and transfers inbound calls to the universal agent in a ready status in the same manner as inbound calls are transferred to the dedicated inbound agents. The process then continues to monitor inbound call status, as indicated in FIG. 2.

If the control processor 20 makes a determination at decision block 64 to switch universal agents from inbound operation to outbound operation, the control processor 20 selects an available universal operation (block 76) and issues a command to inbound controller 16 over data link 36 placing, the universal operator in a not-ready status for outbound operation, block 77, making the universal agent potentially available for outbound operation at the completion of any call then in progress. The control processor 20 next reestablishes the audio connection with this universal agent over tie trunk 40, block 80, and sends an audio signal indicating the change in status, so that the universal agent can connect his terminal 34 to connect it to control processor 20, block 82. The control processor 20 changes the status of this universal agent status to available for outbound operation (block 84) and outbound calls are transferred to this universal agent by the control processor 20 in the same manner as calls are transferred to dedicated outbound agents 27, again checking before each transferred call that the universal agent is logged-on to the automatic inbound call distributor 10.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method for integrating an inbound call distributor and outbound call dialer, comprising the steps of:

transmitting an inbound call status request from said outbound call dialer to said inbound call distributor;

transmitting inbound call status data from said inbound call distributor to said outbound call dialer in response to said status request; and designating a universal agent's status as one of available for inbound operations and available for outbound operations based on said inbound call status data received by said outbound call dialer.

* * * * *